United States Patent [19]

Delafield

[11] Patent Number: 4,488,698
[45] Date of Patent: Dec. 18, 1984

[54] CONNECTION JOINT FOR ARTICLE OF FURNITURE

[76] Inventor: Fredrick B. Delafield, 6722 Amberley La., Clemmons, N.C. 27012

[21] Appl. No.: 289,321

[22] Filed: Aug. 3, 1981

[51] Int. Cl.³ .............................. F16M 11/16
[52] U.S. Cl. .................... 248/188; 52/475; 108/156; 211/182; 248/188.8
[58] Field of Search ........... 248/188, 188.1, 250, 248/188.8; 108/156; 403/241, 247, 258, 375; 52/280, 475, 476, 656; 211/182, 183; 411/104

[56] References Cited

U.S. PATENT DOCUMENTS

| | | |
|---|---|---|
| 564,005 | 7/1896 | Coburn . |
| 1,376,150 | 4/1921 | Miller . |
| 2,516,933 | 8/1950 | Wallance . |
| 2,767,951 | 10/1956 | Cousino ............... 248/245 |
| 3,519,292 | 7/1970 | Krikorian ............. 403/258 |
| 3,534,818 | 10/1970 | Mascaro .............. 403/241 |
| 3,748,814 | 7/1973 | Cribben ............... 52/668 |
| 3,879,906 | 4/1975 | Hollenberg ........... 248/188 |
| 3,883,104 | 5/1975 | Delafield ............. 211/182 |
| 3,883,104 | 5/1975 | Delafield ............. 248/188 |
| 3,887,288 | 6/1975 | Glaser ................. 248/188 |
| 3,981,250 | 9/1976 | Anthony .............. 248/188 |
| 4,030,266 | 6/1977 | Cody .................. 403/405 |
| 4,039,133 | 8/1977 | Streicher ............. 248/188.8 |
| 4,132,178 | 1/1979 | Mueller et al. ........ 248/188 |
| 4,204,375 | 5/1980 | Good .................. 52/239 |

Primary Examiner—Ramon S. Britts
Assistant Examiner—Ramon O. Ramirez

[57] ABSTRACT

A connection joint for use in constructing an article of furniture by the connection of a tubular member to a second member which is inserted in a cut out in the tubular member. An insert clamp within the tubular member surrounds the second member which is held to the tubular member by a fastener engaging the insert clamp.

4 Claims, 7 Drawing Figures

U.S. Patent Dec. 18, 1984 Sheet 2 of 2 4,488,698
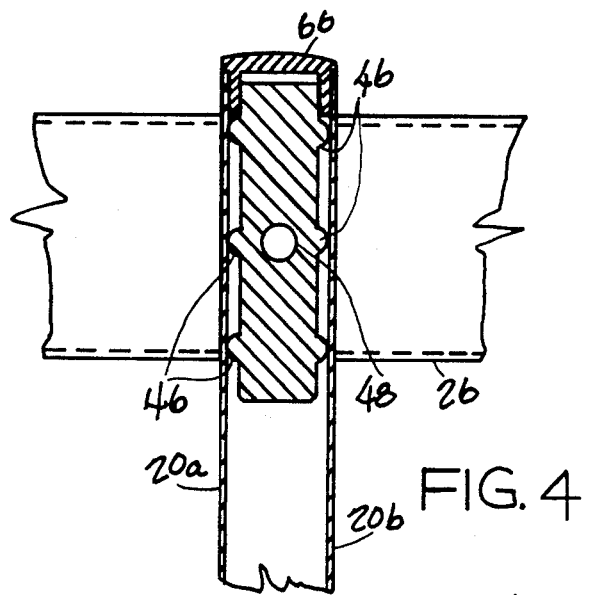
FIG. 4
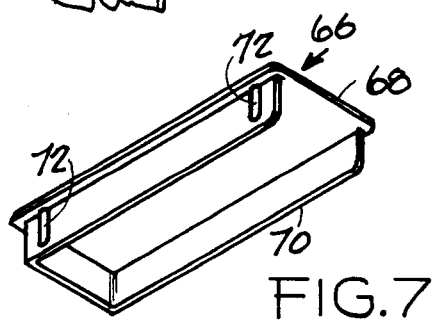
FIG. 7
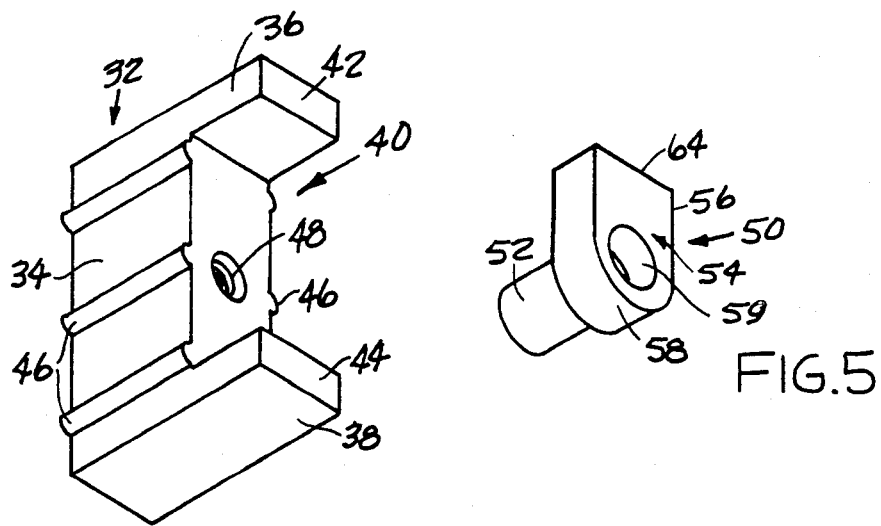
FIG. 5
FIG. 6

CONNECTION JOINT FOR ARTICLE OF FURNITURE

TECHNICAL FIELD

This invention relates to a connection joint for attaching two structural members together and, more particularly, to a connection joint for securely attaching furniture articles together, such as tables, shelves, chairs, etc.

BACKGROUND OF THE INVENTION

In the furniture art, there are two factors which are of primary importance when attaching structural elements or members together to form articles of furniture. First, every element of a connection joint must have sufficient strength to securely fasten the members together and support the loads applied to the joint and, second, the connection should be aesthetically pleasing in appearance. One of the most difficult connections to make, both as to strength and aesthetics, is connecting two metal elements together, particularly when they are used to form table or shelving frames which utilize a separate transparent top or shelf made of a substance such as glass. For example, when a glass top is used for a table, every connection normally can be seen; therefore, it is of utmost importance that the connections be aesthetically pleasing to the eye. In the past, it has been necessary to weld these metal elements together in order to get a strong joint and the appropriate aesthetic appearance.

One problem with having to weld a furniture article is having to ship it in an assembled condition. As can be easily understood, shipping a frame in an assembled state results in an enormous waste of shipping and storage space. Thus, it is important to the furniture manufacturer as well as the retailer and the ultimate consumer that the furniture be designed to be disassmebled for shipment and storage in order to reduce the cost of the item.

Welding is also expensive and requires a great deal of expertise to obtain a weld joint that is strong and not discolored.

SUMMARY OF THE INVENTION

It is, therefore, an object of this invention to provide a connection joint for use in the furniture industry to connect two structural members together which is both strong and aesthetic in appearance.

Another object of this invention is to provide means for securing supporting legs to a furniture article.

It is a further object of this invention to provide a furniture frame which can be shipped in a disassembled condition to be assembled by the retailer or consumer.

Finally, it is a further object of this invention to provide an inexpensive means for connecting two metal members together which gives the appearance of the weld but which can be disconnected for shipment.

These and other objects are accomplished by the present invention through the use of a tubular supporting member having a cut out portion formed therein which is intermediate the end of the tubular member. The cut out portion is generally in the configuration of a second member which is to be secured to the tubular member. An insert clamp within the tubular member includes a recess which corresponds generally to the cut out portion in the tubular member. A securing fastener is inserted through the second member and into the threaded aperture in the insert clamp to hold the members securely together. A support element can be attached by the fastener to the joint which will support a horizontal plate member. A cap is utilized to cover the opening in the tubular member.

BRIEF DESCRIPTION OF THE DRAWINGS

FIG. 4 is a section view taken along line 4—4 of FIG. 3;

FIG. 5 is a perspective of an insert clamp utilized in the connection joint according to the present invention;

FIG. 6 is a perspective of a support element which supports a horizontal plate member according to the present invention; and FIG. 7 is a perspective of a cap element which is utilized to cover the end of a tubular structural member used in the construction of a furniture article according to the present invention.

DESCRIPTION OF A PREFERRED EMBODIMENT

Figure 1:
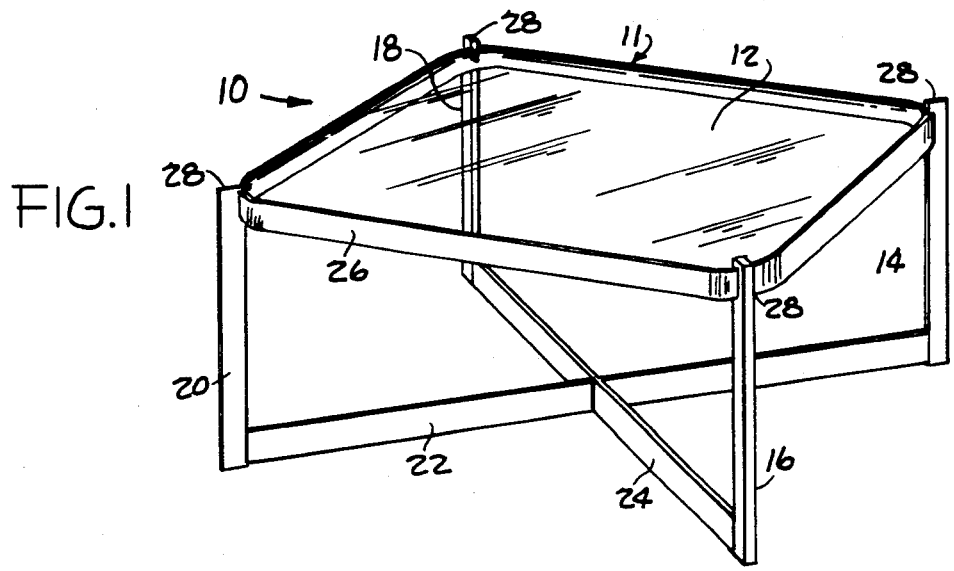
FIG. 1 is a perspective of an assembled article of furniture which utilizes the connection joint according to the present invention.

Referring more particularly to the drawings, in FIG. 1, the numeral 10 indicates an item of furniture, more specifically, a table having a metal frame 11 and a transparent top 12 of glass, plastic or the like. Although the present invention is specifically used to connect metal frame members together without the need for welding, it should be understood that other materials, such as plastic, can be used. Furthermore, the present invention will normally be used with an item of furniture which utilizes a transparent or semi-transparent top member 12 because of the aesthetic appearance of the connection, although opaque materials can be used for the top member, if desired. The table 10, in FIG. 1, has four vertical support legs 14, 16, 18 and 20 with intersecting cross members 22 and 24 attached to the legs and extending between legs 14, 20 and 16, 18, respectively. The method of connecting the legs to the cross members is known in the art and is not considered part of this invention.

Figure 2:
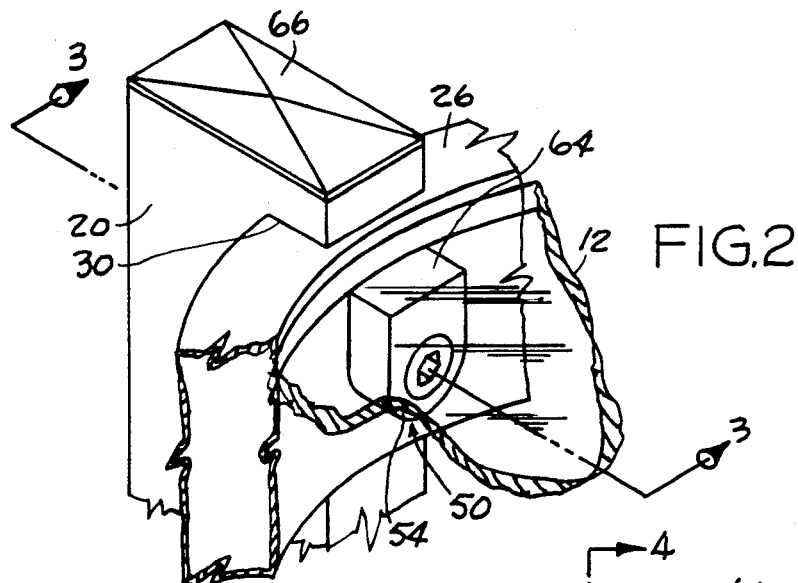
FIG. 2 is a detailed perspective of the connection joint according to the present invention.
Figure 3:
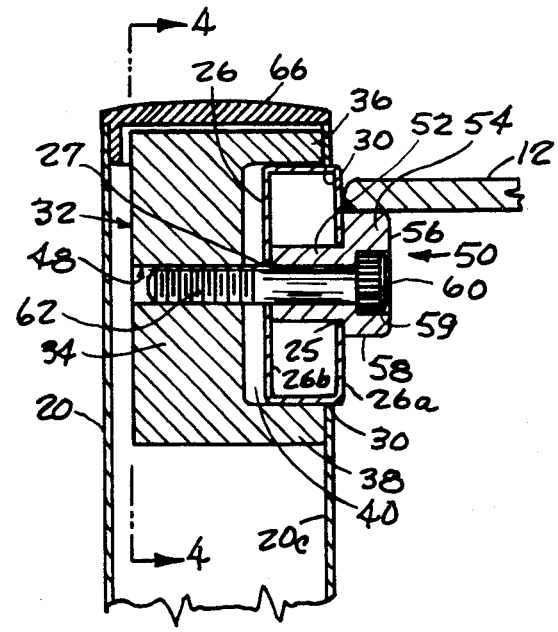
FIG. 3 is a section view taken along line 3—3 of FIG. 2.

A generally rectangular-shaped horizontal frame 26 having carved or rounded corners is secured contiguous to the upper end of the four vertical support legs by connection joint 28 which can be seen in more detail in FIGS. 2 and 3. It should be apparent that the connection joints 28 can be used to construct other items of furniture, such as a bookcase having a plurality of shelves, or simply the connection between the legs of a chair and a seat frame. The connection can also be used at locations other than at a corner, for example, at the middle of a straight side frame member. Although it is possible to utilize the joint connection 28 with a horizontal frame having 90° corners, by slightly modifying some of the elements of the connection, the rounded corner frames are the most efficient to utilize.

The connection joint 28 is formed by a support leg 20 which, in the illustrated embodiment, has a rectangular tubular cross section although other tubular cross section configurations such as a square or circle can be used. A cut out or notch 30 is cut or formed in the inner side of the support leg intermediate its ends. In the embodiment illustrated in the drawings, the cut out 30 is contiguous to the upper end of the support leg though, as mentioned above, the connection can be utilized in a furniture article having a plurality of shelves whereby a plurality of such connections would be used and located at various points along a vertical support leg.

As can be seen in FIG. 2, the cut out 30 is formed in the configuration of only a portion of the horizontal frame member 26 which is inserted therein. Although in this embodiment the cut out 30 is not the full size of a cross section of the horizontal frame member 26, it can be if so desired. The cut out shall be formed so that the horizontal frame member 26 fits snugly therein to prevent rotation and to give the appearance that the members are welded together when the connection is completed. In this preferred embodiment, the side frame member 26 is a tubular element although a solid bar member can be used.

An insert clamp 32 (see FIGS. 3 and 6) having a body portion 34 and upper and lower outwardly extending flanges 36 and 38 is positioned within said tubular support leg 20. Preferably, the insert clamp is a plastic or nylon material but any other material such as metal, wood or the like can be used. The body portion 34 and flanges 36 and 38 form a recess, a notch, 40 which generally corresponds in size and shape to the cut out 30 in the supporting leg 20, though the recess 40 can be made larger or deeper, as can be seen in FIG. 3. A semi-circular recess could also be used. The end surface of 42 and 44 of the flanges 36 and 38, respectively, engage the inside surface 20c of the tubular support legs above and below the cut out 30. A plurality of ridges or elongated protrusions 46 are integrally formed on opposite sides of the body portion of the insert and are spaced at various locations to permit contact with inside surface of the walls 20a and 20b of the support leg 20 (see FIG. 4). These ridges are utilized to frictionally hold the insert in place within the support leg. It should be noted that the clamp is not as deep as the tubular leg member which permits the clamp to be inserted witin the tubular leg through the cut out 30. Centered in the body portion 34 of the insert clamp between the flanges is a threaded aperture 48.

A support element 50, as can be seen in FIGS. 3 and 5, is provided to support a plate or top member 12. The support element 50 has a generally L-shaped configuration which includes a tubular portion 52 that is integrally formed with a support portion 54. The support portion has flanges 56 and 58 which extend beyond opposite sides of the tubular portion 52 and engage the outer surface of side wall 26a of the side frame member 26 when the tubular portion 52 is inserted through an opening 25 in the side wall 26a. The end of the tubular portion 52, which extends through wall 26a, engages the inside surface of wall 26b and circumscribes an opening 27 in that wall. Although it is preferred that the support member engages both surfaces of the side member 26 as mentioned above to provide a more stable connection, it is not an absolute necessity that the tolerance of the support element be so exact.

The support portion 54 has a countersunk recess 59 which communicates with the hole through the tubular portion 52. A fastener 62 extends through the support member having its head 60 within the countersunk recess 59 to give a finished appearance. The threaded end of the fastener engages the threaded aperture 48 of the insert clamp 32. The upper surface 64 of the flange 56 is flat and supports the horizontal top member 12.

If the connection joint 28 is used near the upper end of a tubular support leg, a cap 66 is used to cover the end of the tubular opening. The cap has a top portion 68 generally conforming in configuration and size to the tubular support member. A depending flange or skirt 70 extends from the under surface of the top portion along three sides. The depending flange is spaced inwardly from the peripheral edge of the top 68 so that the top overlaps the walls of the tubular member. Vertical ridges 72 are provided on the outside surface of the depending flange 70 to frictionally engage the inside surface of walls of the support leg 20 to hold the cap securely in position.

Although the preferred embodiment of the invention as illustrated and described herein is a table, other items of furniture can be made utilizing the connection joint 28. Furthermore, many changes in the configuration of the various elements can be made without varying the scope of the invention, for example, the shape of the tubular legs can be changed, the shape and size of the insert clamp, the frame member can be solid rather than tubular, the support element 50 and the cap can have different configurations and the material for the various elements can be changed; however, none of these changes will detract from the scope of the present invention as defined in the following claims.

I claim:

1. A connection joint for securing structural members of furniture items comprising:
    (a) a tubular member having a cut out which is intermediate the ends of said tubular member;
    (b) a second member having the same general configuration of at least a portion of said cut out, said second member having an aperture therethrough and fitting snuggly into said cut out;
    (c) an insert clamp carried in said tubular member having a recess corresponding generally to the size of said cut out in said tubular member and a threaded aperture therein, said insert clamp being so positioned that the recess surrounds the cut out and the insert clamp engages the inside surface of said tubular member above and below said cut out;
    (d) support element secured to said joint connection; and
    (e) fastener means engaging said support element and second member and extending therethrough into said threaded aperture in said insert clamp holding said joint connection securely together.

2. The connection joint of claim 1, wherein said tubular member is a supporting leg for a table and said second member is the horizontal side member forming a portion of the frame of said table.

3. The connection joint of claim 1, wherein said tubular member and said second member are made of metal.

4. An improved connection joint for use in forming articles of furniture having four support legs, a horizontal side frame and a horizontal transparent top member, the improvement comprising:
    (a) a rectangular tubular support leg having a rectangular shaped cut out intermediate its ends;
    (b) a rectangular tubular side frame member corresponding generally in shape to said cut out in said support legs and inserted therein, said side frame having a first and second aperture in its outside and inside vertical walls, respectively, said second aperture being greater in size than said first aperture;
    (c) an insert clamp carried in said tubular support leg having a body portion with upper and lower flanges forming a recess generally corresponding to the shape of said cut out in said support leg, said clamp being so positioned that the ends of said upper and lower flanges engage the inside surface of said tubular leg above and below said cut out, said body portion of said insert clamp having a threaded aperture therein;

(d) a support element having a tubular portion and an upwardly extending portion, said tubular portion extending through the second aperture in said side tubular frame; and (e) a threaded fastener extending through said tubular portion of said support element and into the threaded aperture of said insert clamp.

* * * * *